United States Patent
Chou et al.

(10) Patent No.: US 7,211,969 B2
(45) Date of Patent: May 1, 2007

(54) POWER DRIVER CIRCUIT OF DISPLAY PANEL

(75) Inventors: Chin-Wen Chou, Hsin-Tien (TW); Ying-Nan Cheng, Hsin-Tien (TW); Chin-Biau Chung, Hsin-Tien (TW)

(73) Assignee: Zippy Technology Corp., Taipei, Taiwan (CN)

( * ) Notice: Subject to any disclaimer, the term of this patent is extended or adjusted under 35 U.S.C. 154(b) by 30 days.

(21) Appl. No.: 11/092,584

(22) Filed: Mar. 29, 2005

(65) Prior Publication Data

US 2006/0220588 A1    Oct. 5, 2006

(51) Int. Cl.
*H05B 37/00*    (2006.01)

(52) U.S. Cl. ............... 315/313; 348/730; 345/211

(58) Field of Classification Search ........... 315/209 R, 315/307, 291, 106, 169.1–169.4, 301, 302, 315/363, 362; 345/211–213, 10; 363/17, 363/28, 65; 348/730; 361/114
See application file for complete search history.

(56) References Cited

U.S. PATENT DOCUMENTS

| | | | | |
|---|---|---|---|---|
| 4,587,604 A | * | 5/1986 | Nerone | 363/17 |
| 5,161,241 A | * | 11/1992 | Kanai | 348/730 |
| 5,530,635 A | * | 6/1996 | Yashiro | 363/65 |
| 6,516,716 B1 | * | 2/2003 | Robertson et al. | 101/41 |
| 6,812,920 B1 | * | 11/2004 | Otsuka | 345/211 |
| 2001/0022734 A1 | * | 9/2001 | Sato | 363/21.08 |

* cited by examiner

*Primary Examiner*—Tuyet Vo
*Assistant Examiner*—Ephrem Alemu
(74) *Attorney, Agent, or Firm*—Birch, Stewart, Kolasch, and Birch, LLP

(57) ABSTRACT

A power driver circuit for a display panel. The power driver circuit includes a power controller, and a resident power system, which is coupled to an alternating power source and provides resident power for the power controller. When receiving an external on/off signal, the power controller will output driving signals to initiate or close the low-voltage power converter system and the high-voltage power converter system to determine whether a low-voltage power and a high-voltage power are output to drive the display panel. Thereby, when the display panel is in an off state, only the resident power system works. Thus, the power-saving demand of environmental protection is satisfied.

6 Claims, 2 Drawing Sheets

POWER DRIVER CIRCUIT OF DISPLAY PANEL

FIELD OF THE INVENTION

The present invention relates to a power driver circuit of display panel, particularly to one, wherein when the display panel is off, the resident power system provides resident power only for the power controller, and the low-voltage power converter system and the high-voltage power converter system are in off state so that the power-saving demand of environmental protection can be satisfied.

BACKGROUND OF THE INVENTION

The current power-driving method of LCD panel is that the alternating-current power output by the alternating power source is converted by an AC/DC power supply into the low-voltage direct-current power, wherein the present specification of the direct-current low-voltage power adopted by various manufacturers includes 5V, 12V, 24V, 48V, etc. The low-voltage direct-current power is provided for the low-voltage loads of the display panel, including driver circuit of the display panel, image-processing circuit board, speakers, etc. The low-voltage direct-current power is also shunted to a high-voltage power converter system, and the high-voltage power converter system boosts the low-voltage direct-current power to output a high-voltage power to drive the high-voltage load of the display panel, which is the display panel's backlight module having gas-discharge lamps, such as cold cathode fluorescent lamps.

With the uprising of environmental protection, the design of power driver circuit has to meet the demand of promoting the power factor or power efficiency in order to achieve the objective of energy saving. A lower-voltage power converter system also has a power-factor corrector to reduce power consumption. The size of LCD panel is growing larger and larger, especially that of LCD TV, and thus, the driving power for high-voltage loads is also growing higher responsively. The conventional power source of the high-voltage power converter system comes from the lower-voltage direct-current power output by the lower-voltage power converter system; thus, the larger-size LCD TVs, such as 32 inch or 40 inch, need larger lower-voltage power converter system to output higher power. The specification of active power-factor corrector is growing more and more complex and becomes hard to fabricate. Further, the conventional power-factor corrector is based on the capacitive charge or discharge, which results in that when the display panel is switched off, the low-voltage power converter system, which is normally electrically coupled to the alternating power source, will still consume a given amount of electrical power, and it will not meet the severe electrical-power standard of environmental protection, such as power consumed in standing-by less than 1 W.

SUMMARY OF THE INVENTION

To solve the aforementioned problems, the primary objective of the present invention is to provide a power driver circuit of display panel, which adopts a design that a resident power system, a low-voltage power converter system and a high-voltage power converter system are separately initiated, wherein when the display panel is standing by, only the resident power system is electrically coupled to the alternating power source to output a resident power to a power controller, and the low-voltage power converter system and the high-voltage power converter system are in off state. When receiving an external on/off signal, the power controller will output driving signals to initiate or close the low-voltage power converter system and the high-voltage power converter system to determine whether a low-voltage power and a high-voltage power are output to drive the display panel. Thereby, when the display panel is off, only the resident power system works, and the power-saving objective of environmental protection is achieved.

DETAILED DESCRIPTION OF THE PREFERRED EMBODIMENTS

In cooperation with the drawings, the detailed description and technical contents of the present invention is stated below.

Figure 1:
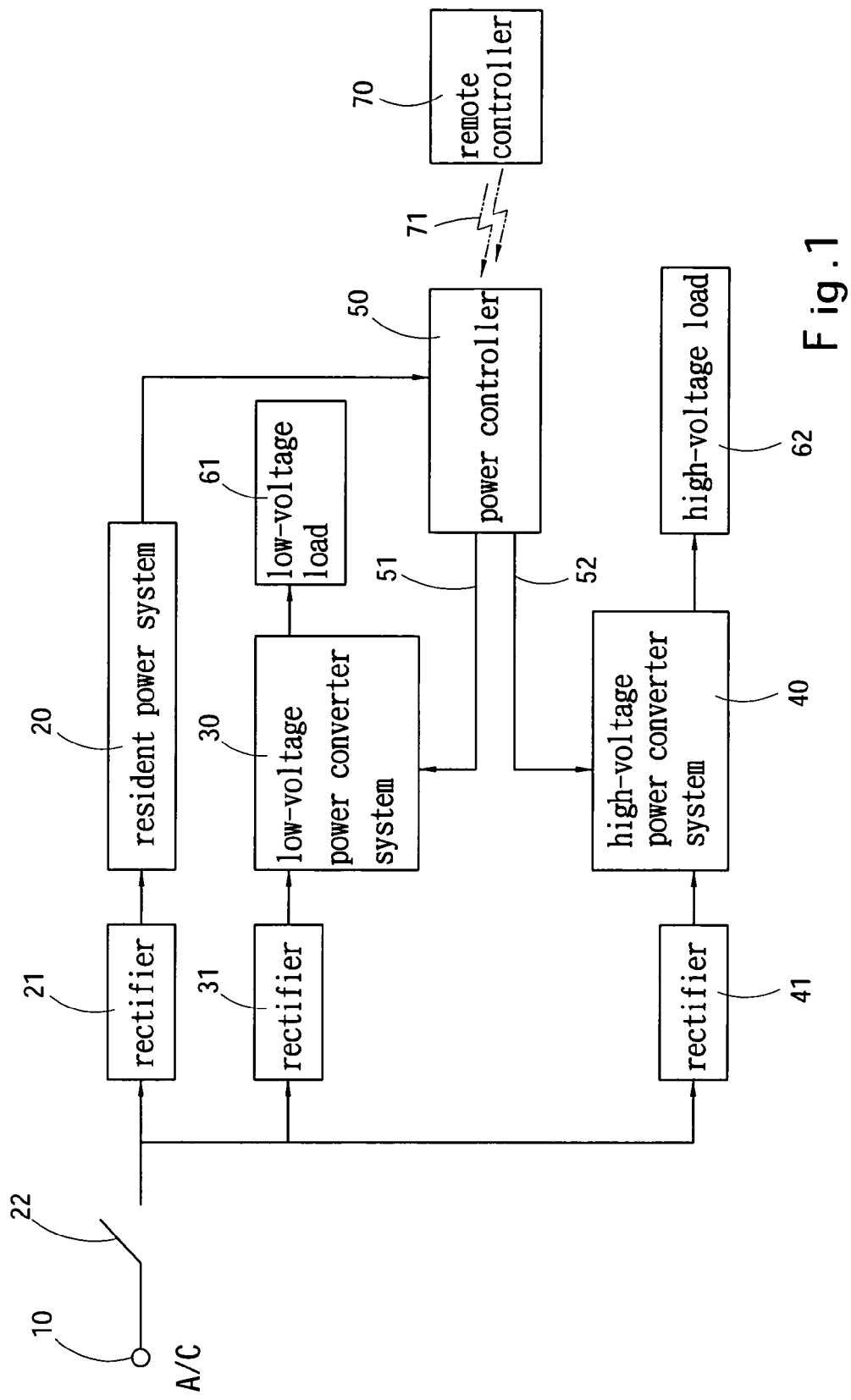
FIG. 1 shows schematically the circuit block diagram of a first embodiment of the present invention.

Referring to FIG. 1, which shows schematically the circuit block diagram of a first embodiment of the present invention, the power driver circuit of display panel of the present invention, which is electrically coupled to an alternating power source 10 to convert the power to drive the display panel, comprises:

a resident power system 20, which is normally electrically coupled to the alternating power source 10 and provides resident power for a power controller 50 that controls the on/off of the display panel, wherein the power controller 50 receives an external on/off signal 71 and outputs driving signals 51 and 52;

a low-voltage power converter system 30, which is normally electrically coupled to the alternating power source 10 and initiated or closed by the driving signal 51, wherein when initiated, it outputs the transformed low-voltage power to drive a low-voltage load 61 of the display panel; and a high-voltage power converter system 40, which is normally electrically coupled to the alternating power source 10 and initiated or closed by the driving signal 52, wherein when initiated, it outputs the transformed high-voltage power to drive a high-voltage load 62 of the display panel.

Figure 2:
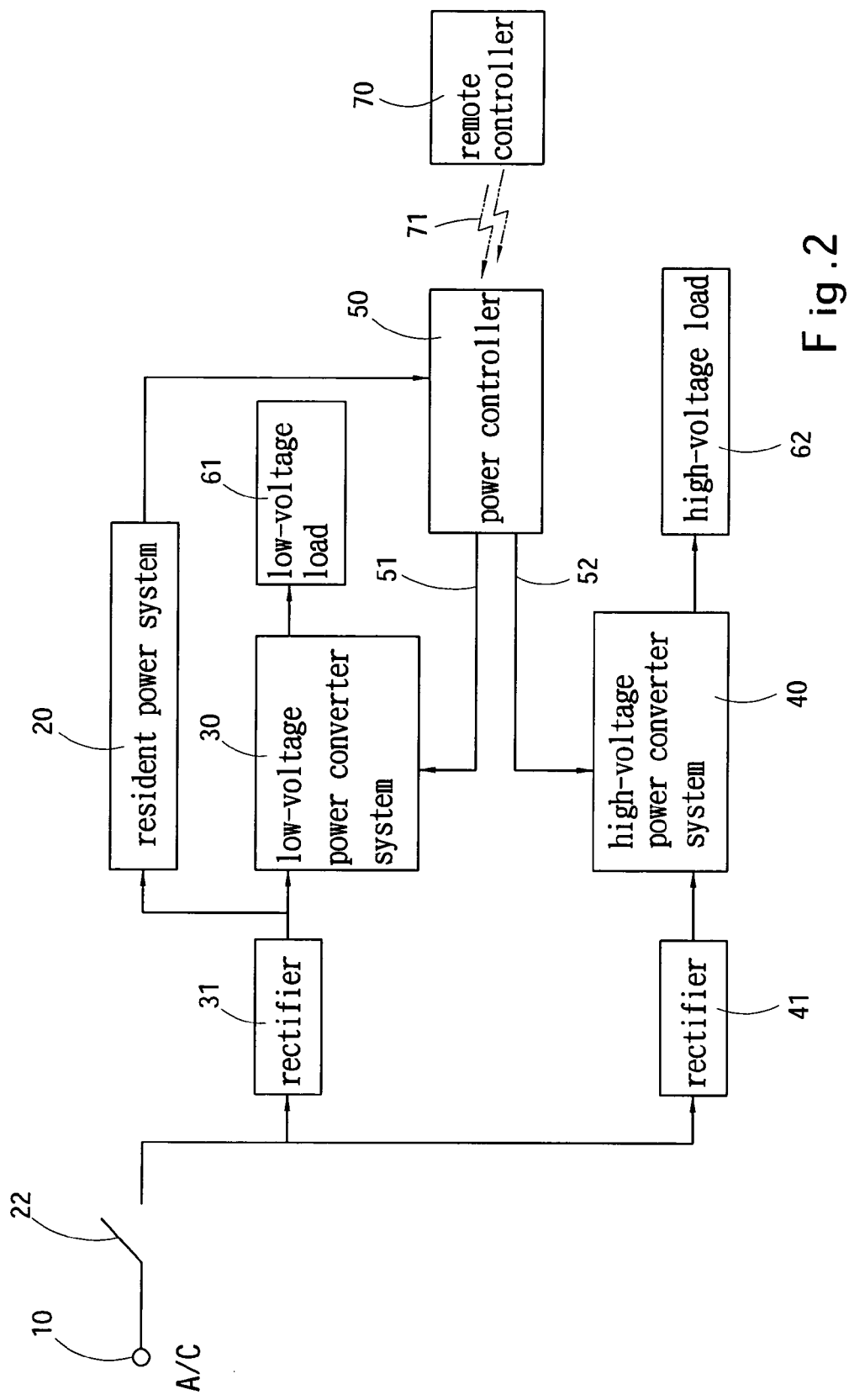
FIG. 2 shows schematically the circuit block diagram of a second embodiment of the present invention.

In this embodiment, a rectifier 21, 31, or 41 is interposed between and electrically coupled to the alternating power source 10 and each of the resident power system 20, the low-voltage power converter system 30, and the high-voltage power converter system 40. In contrast with the first embodiment, in a second embodiment shown in FIG. 2, the resident power system 20 and the low-voltage power converter system 30 commonly utilize a rectifier 31, which is disposed between and electrically coupled to the alternating power source 10 and both of the resident power system 20 and the low-voltage power converter system 30, and the high-voltage power converter system 40 has a rectifier 41 independently. However, as the aforementioned two rectifying methods are the conventional technologies and familiar to the persons skilled in the art, the present invention will be exemplified with the first embodiment below, and the second embodiment will not be repeated any more.

The present invention is also to be illustrated with the display panel of LCD TV. A switch 22 is disposed between the resident power system 20 and the alternating power source 10, and the switch 22 is generally installed in the lower portion of the front faceplate of the display panel of LCD TV. When the switch 22 is on and the circuit is closed, the alternating power source 10 and the resident power system 20 will keep in the state of normal electric connection, and the alternating-current power output by the alternating power source 10 will be converted by rectifier 21 and the resident power system 20 into direct current power, which is further output to the power controller 50. The power controller 50 can be a switch circuit or a microcontroller and can also be built inside the resident power system 20 or on the image-processing circuit board among the low-voltage load 61 of the display panel of LCD TV, and the power controller 50 can also be an independent device. When intending to open the display panel of LCD TV, the user utilizes a remote controller 70 to send the external on/off signal 71; the power controller 50 receives the external on/off signal 71 and outputs the driving signals 51 and 52 to activate the low-voltage power converter system 30 and the high-voltage power converter system 40. The low-voltage power converter system 30 converts the alternating-current power output by the alternating power source 10 into direct-current low-voltage power, wherein the present specification of the direct-current low-voltage power adopted by various manufacturers includes 5V, 12V, 24V, 48V, etc. The direct-current low-voltage power is provided for the low-voltage loads 61 of the display panel, including a driver circuit of the display panel, an image-processing circuit board, speakers, etc. The high-voltage power converter system 40 converts the alternating-current power output by the alternating power source 10 to output high-voltage power to drive the high-voltage load 62 of the display panel, which is the display panel's backlight module having gas-discharge lamps, such as cold cathode fluorescent lamps.

According to the above description of the embodiments of the present invention, it is obvious that when the display panel of LCD TV is off (the external on/off signal 71 output by the remote controller 70 is an off signal), the power controller 50 will switch off the low-voltage power converter system 30 and the high-voltage power converter system 40. Therefore, when the display panel of LCD TV is standing by, only the resident power system 20, which consumes little power, works, and thus, the low electricity-consumption demand for environmental protection is to be satisfied.

Those described above are only the preferred embodiments and not intended to limit the scope of the present invention. Any equivalent modification or variation according to the claims of the present invention is to be included within the scope of the present invention.

What is claimed is:

1. A power driver circuit of a LCD display panel, which is electrically coupled to an alternating power source to convert the power to drive said display panel, comprising:
   a resident power system, which is normally electrically coupled to said alternating power source and provides a resident power for a power controller that controls said display panel on and off, wherein said power controller receives an external on/off signal which is a wireless signal for a remote control and outputs driving signals;
   a low-voltage power converter system, which is normally electrically coupled to said alternating power source and initiated or closed by said driving signal, wherein when initiated, said low-voltage power converter system outputs a transformed low-voltage power to drive a low-voltage load of said display panel; and
   a high-voltage power converter system, which is normally electrically coupled to said alternating power source and initiated or closed by said driving signal, wherein when initiated, said high-voltage power converter system outputs a transformed high-voltage power to drive a high-voltage load of said display panel.

2. The power driver circuit of display panel according to claim 1, wherein a switch is disposed between said resident power system and said alternating power source.

3. The power driver circuit of display panel according to claim 1, wherein said power controller is a switch circuit.

4. The power driver circuit of display panel according to claim 1, wherein said power controller is a micro controller.

5. The power driver circuit of display panel according to claim 1, wherein a rectifier is interposed between and electrically coupled to said alternating power source and each of said resident power system, said low-voltage power converter system, and said high-voltage power converter system.

6. The power driver circuit of display panel according to claim 1, wherein said resident power system and said low-voltage power converter system commonly utilize a rectifier, which is disposed between and electrically coupled to said alternating power source and both of said resident power system and said low-voltage power converter system, and wherein said high-voltage power converter system has a rectifier independently.

* * * * *